March 1, 1966   R. DUDAS   3,237,749
CONVEYOR FOR INCREMENTAL COUNTER AND LOADING MEANS THEREFOR
Filed March 9, 1964   4 Sheets-Sheet 1
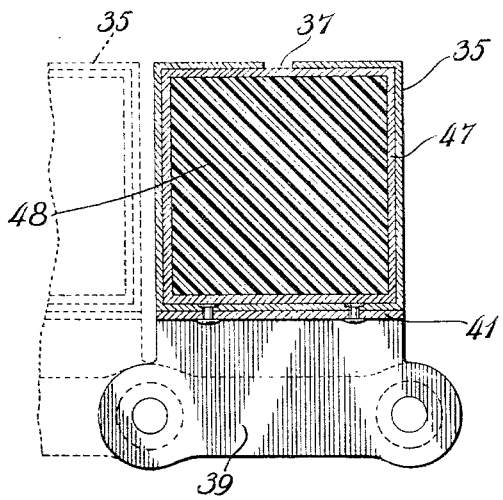
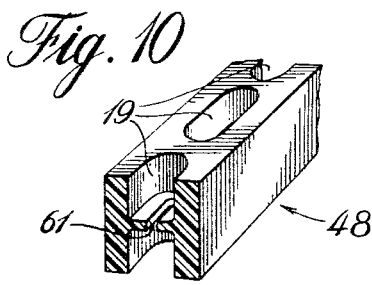
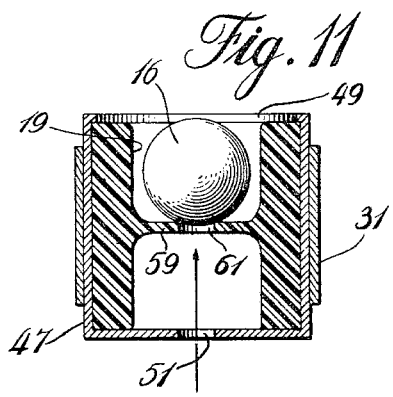
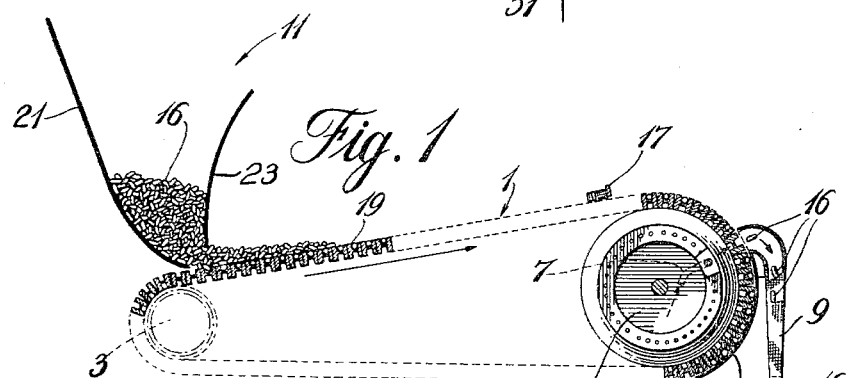
INVENTOR
Rudolf DUDAS
BY
ATTORNEYS March 1, 1966 R. DUDAS 3,237,749
CONVEYOR FOR INCREMENTAL COUNTER AND LOADING MEANS THEREFOR
Filed March 9, 1964 4 Sheets-Sheet 2

INVENTOR
Rudolf DUDAS
BY

ATTORNEYS

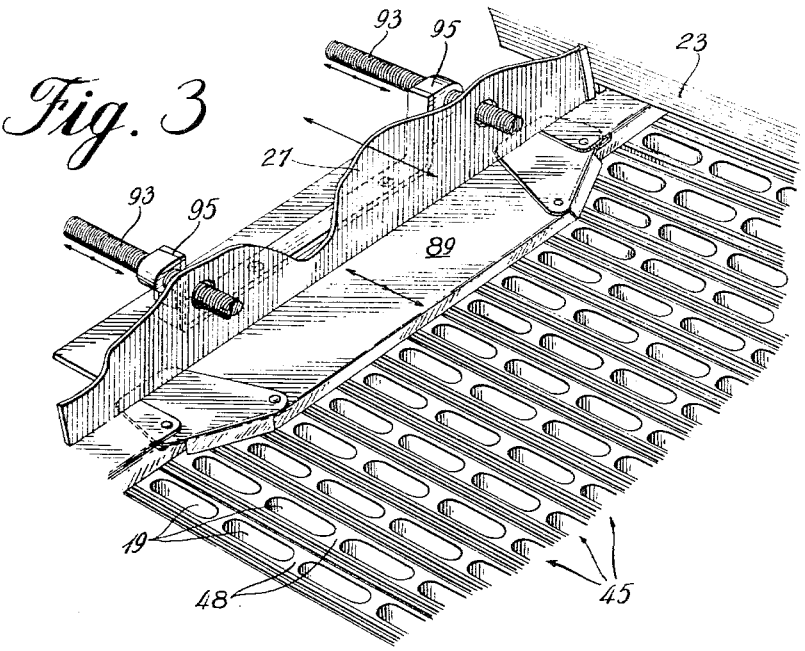
*Fig. 3*
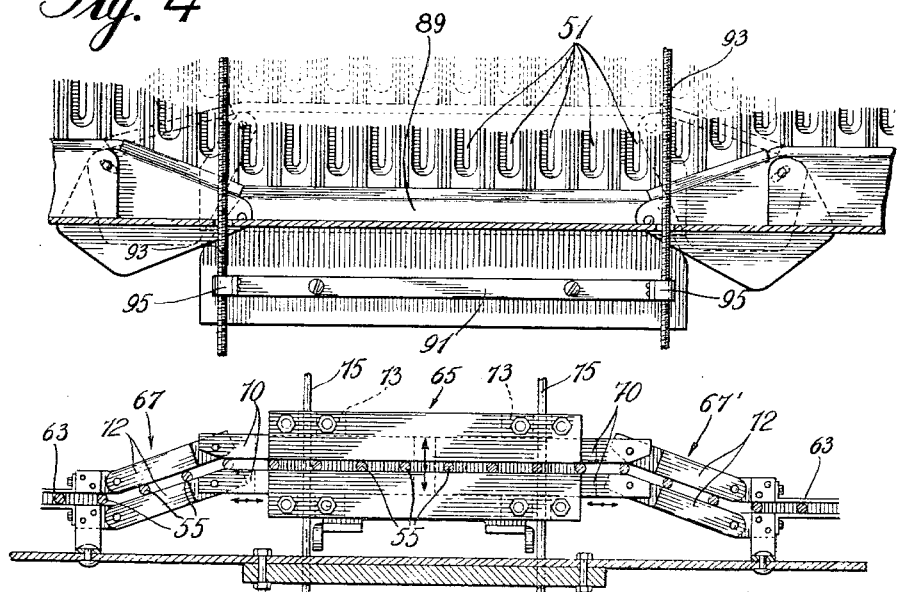
*Fig. 4*
*Fig. 5*
INVENTOR
Rudolf DUDAS
BY
ATTORNEYS INVENTOR
Rudolf DUDAS
BY

ATTORNEYS

United States Patent Office 3,237,749
Patented Mar. 1, 1966

3,237,749
CONVEYOR FOR INCREMENTAL COUNTER
AND LOADING MEANS THEREFOR
Rudolf Dudas, 65 58th Ave., Laval-des-Rapides,
Quebec, Canada
Filed Mar. 9, 1964, Ser. No. 350,388
7 Claims. (Cl. 198—30)

The present invention relates to a machine for counting small objects such as pills, tablets, capsules, buttons and the like, all of which are characterized by their relatively simple and similar geometrical shapes as well as by the equality of their sizes.

The invention more particularly relates to a mechanism for conveying these objects and for regulating the feeding thereof to a counter.

The mechanism of the invention is therefore intended for dividing bulk quantities of the small articles into a number of equal and consecutive lots, the discharge of each of which is registered on a counter.

In the following specification, whenever the term "tablet" is used, it should be understood to mean the small articles which make up the bulk lots to be counted, and, are characterized by their equal sizes and similar shapes.

A first main object of the invention is to provide a conveyor on which the random fed tablets of a bulk quantity are disposed and arranged in a predetermined pattern whereby they may, in subsequent operation, be counted and/or divided into numerically equal lots prior to packaging.

A second main object of the invention resides in the provision of a loading hopper wherein the uncounted bulks of tablets are fed and, means cooperating therewith to cause an even distribution and spreading of the tablets on the conveyor whereby each small lot to be discharged will invariably comprise the same predetermined number of tablets.

Yet another object of the invention lies in the provision of a conveyor whereon the articles are disposed in a succession of incrementally equal small lots of the tablets.

The invention, which is intended for use in connection with counting means, is an improvement over prior machines in that, instead of consecutively recording the count of individual articles, the count is obtained by recording the passage of transversely disposed, consecutive and numerically equal lots of the articles: the particular function of the invention being the provision of a proper conveyor and also of hopper and other loading means for achieving an even distribution of the articles on the conveyor.

The above noted objects may be achieved according to the invention, in a machine for packaging tablets in predetermined numbers, comprising the combination of a travelling conveyor formed with a longitudinal succession of transverse elements each of which presents at least one row of cavities into each of which no more than one of the articles may be received; hopper means at the loading end of the said conveyor, said hopper means permitting a gradual discharge of its content on the conveyor surface; shaking or oscillating means within the loading zone of the conveyor, said shaking or oscillating means acting on the transversely disposed elements of the conveyor as the said elements pass under said hopper means, to impart a transverse reciprocal movement of each element at is progresses through the loading zone, thereby shaking the tablets into the cavities.

The device of the invention therefore permits a uniform distribution of the tablets lengthwise of the direction of conveyance and into consecutive and equal numerical increments of tablets.

The present invention is a marked improvement to automatic counting machines and particularly to such machines whereby the counting of small identical objects may be effected.

The invention is primarily concerned with an improved conveyor and to the feeding and arranging means used in combination therewith, all of which may be cooperatively associated on the same machine with other means such as a constant conveyor load checking or sensing device, counter-devices, means for causing the rejection of numerically defective incremental lots before they reach the discharge zone of the conveyor, and others.

The conveyor to which the invention relates belongs to the category of endless chain or belt conveyor and is characterized in that it presents a surface composed of a network of longitudinally and transversely aligned cavities each of which is capable of receiving only one of the objects to be transported by the conveyor. Furthermore the conveyor of the invention is designed with a gentle upward slope at least in the vicinity of its loading end; the upward slope of the conveyor being intended to cause downward tumbling or return of all objects or tablets that have not lodged themselves in one of the aforementioned cavities, thereby contributing in ensuring a constant output at the discharge end of the conveyor when the conveyor velocity is constant.

In practice, the above mentioned constant discharge rate may be disrupted only by the occasional failure of one of the cavities of the conveyor's surface to have captured a tablet during its passage through the loading zone. In order to reduce the frequency of the errors attributable to faulty loading, the conveyor of the present invention is advantageously provided with vibrating or oscillating means within its loading zone and preferably in the aft portion of that zone.

The inventor has found that the most effective oscillating motion for shaking the tablets into position in their respective cavities, is one in which the movement takes place in the plane of the conveyor surface but transversely to its travelling direction. This was achieved in the present invention by a conveyor, the working surface of which is composed of a longitudinal succession of transverse elements each of which is transversely slidable independently of any other such element.

In practice, each such transverse element of the conveyor is made to coincide with one or more transverse rows of the aforementioned network of cavities.

A better understanding of the invention will be had from the following description of a preferred embodiment thereof, having regard to the annexed drawing, wherein:

FIG. 1 is a schematic side elevation view of a tablet counting machine using a conveyor in accordance with the present invention;

FIG. 3 is a perspective view of the oscillating means and as seen from above;

FIG. 4 is a top view of the oscillating means shown in FIG. 3 but with the movement thereof having been rested in a different position;

FIG. 5 is a top view of the portion of the oscillating means under the conveyor surface as viewed in a section parallel to the plane of the conveyor;

FIG. 9 is a cross-sectional view along line 9—9 of FIG. 7;

FIG. 10 is a perspective view of a short length of a typical cavity bar, the section being taken through one of the cavities;

FIG. 11 is a cross-sectional view along line 11—11 of FIG. 7, showing one capsule in nested position inside the cavity through which the section is taken.

Figure 2:
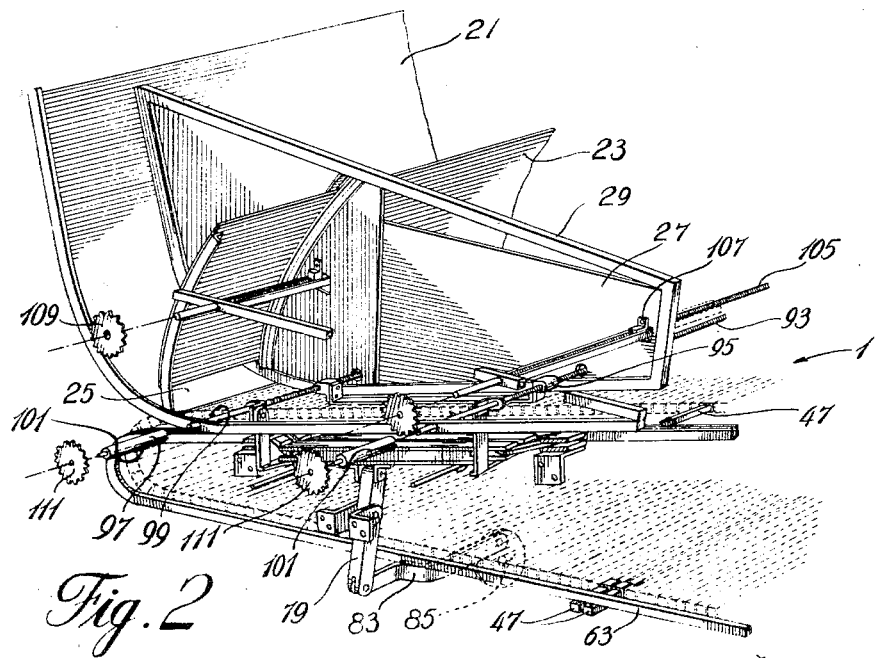
FIG. 2 is a perspective view of the combined hopper loading means, conveyor and oscillating means.

FIG. 1 illustrates, diagrammatically, the various component parts of the packaging machine of which the invention is an important part. It is seen to consist of an endless conveyor 1 having an upwardly inclined conveyance surface at the ends of which it winds around a first pulley 3 and a hollow pulley 5 respectively. Rejecting means 7 being provided inside the hollow pulley 5; said rejecting means being intended to selectively reject or blow out such as by means of a jet of air, each transverse row of tablets that has been detected or found to be incompletely filled. The material 16 being blown out into a reject chute 9 at the bottom of which it accumulates for later return to the loading hopper generally denoted by number 11. A baffle plate 13 in closely spaced relation with the surface of the conveyor as it passes around the pulley 5, is provided below the entry of the reject chute 9 and extends downwardly in order to ensure that all the tablets or capsules in any transverse row will be discharged simultaneously by gravity into a discharge chute 15.

Generally, the conveyor is formed of a succession of interconnected parallel bars each provided with at least one row of cavities 19. The tablets 16 are fed into the hopper means 11 to fall over the conveyor. At this time, the expression "hopper means area" as hereinafter used should be defined as that area lying forwardly of the hopper opening, where the tablets are driven into cavities 19 in a manner to be more fully described below.

From FIG. 1 it will be seen also that the conveyor is preferably provided with a stationary broom 17 intended to sweep back any tablet that may not have fallen into a cavity.

From FIG. 2, it will be seen that the hopper means 11 is made up of the hopper proper which is composed of a forwardly inclined back plate 21 and also forwardly inclined front plate 23: the two plates being so disposed as to provide a hopper outlet 25, above conveyor 1, opening into the hopper means area. The hopper means is also composed of arrester plates 27, one on each side of the conveyor, intended to prevent any tablet from falling off. Each arrester plate is mounted around a suitable frame 29 forwardly of front plate 23 and one such plate is movable across conveyor 1 as will hereinafter be more fully explained.

Figure 8:
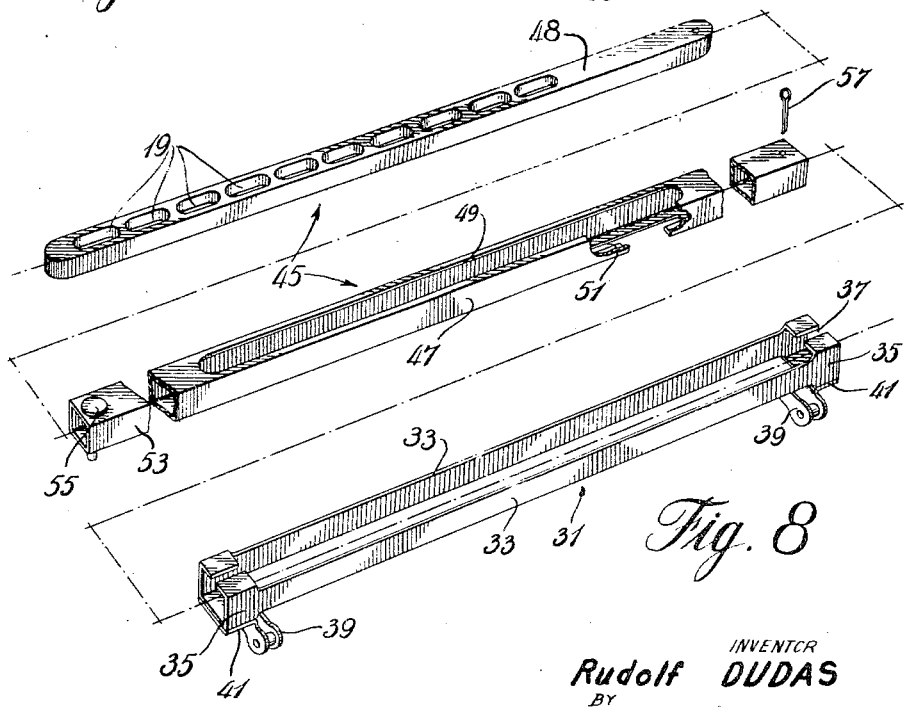
FIG. 8 is an exploded view showing the construction of one of the transversely disposed elements which compose the actual conveyor.
Figure 7:
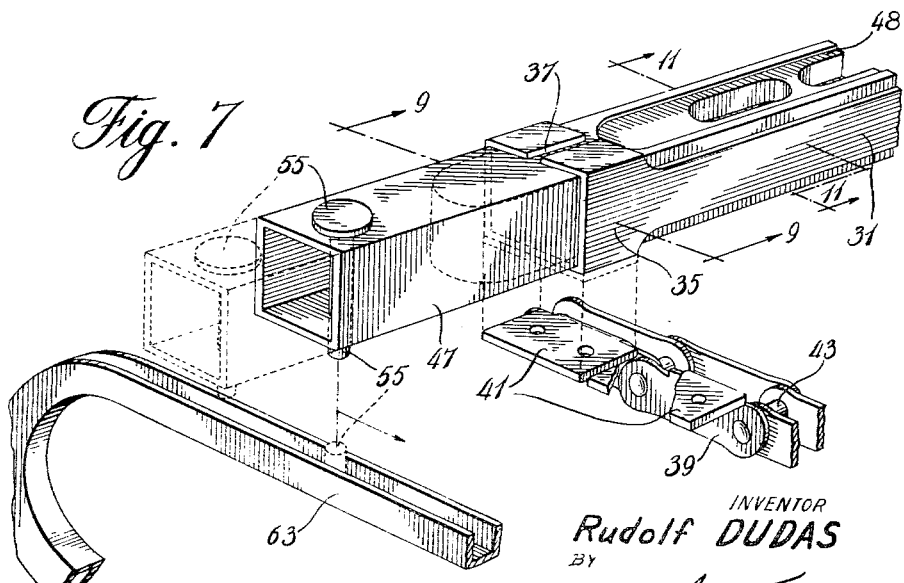
FIG. 7 is an exploded partial view intended to illustrate the conveyor and the tutoring means.

Conveyor 1 is formed with a succession of parallel guiding members 31, illustrated in detail in FIGS. 7 and 8. It will be seen that each guiding member is formed of two elongated rectangular side bars 33 terminating at each end into a square collar 35, preferably slitted as at 37. Each square collar 35 is secured, at the bottom thereof, to a support bracket 41 of a chain link 39. All links on one side are connected together to thus form an endless chain and the assembly with guiding members 31 will produce conveyor 1 without the tablet bars now to be described.

The said bars, generally denoted by numeral 45 in FIG. 8, are formed of two main members: a sleeve 47 and a cavity member 48.

Sleeve 47 is rectangular in shape and made to be slidably received within guiding member 31. It has a slitted top 49 and a slitted bottom 51. Sleeve 47 is longer than the corresponding guiding member 31 so that one end 53 thereof may protrude from the said member 31. A tutoring pin 55 is secured to end 53 and projects from the bottom thereof.

The cavity member is an elongated element intended to enter sleeve 47 and be secured therein in a removable manner by means of a cotter pin 57 or any other suitable connecting device.

Cavity member 48, as its name implies, is formed with a row of aligned cavities 19 extending from one end thereof but terminating short of the other end for a purpose to be determined later.

It will be appreciated, from the description that follows that cavity member 48 could be provided with more than one row of cavities, although one row is preferred.

Also, as more particularly shown in FIGS. 10 and 11, member 48, which could be made of plastic or other similar material, should preferably have two different types of cavities, one at the top and one at the bottom so that each member would have two useful rows of different cavities. The dividing wall 59 should however be provided with a central opening 61. It will be understood from the explanation given in connection with the general description of the machine as related to FIG. 1, that the slitted bottom 51 of sleeve 47 and apertures 61 of member 48 are provided for the passage of the jet of air which is used, under certain circumstances, to discard the tablets in the corresponding cavities, as when an error detecting machine has discovered that one cavity of the row has no tablet therein.

The assembly of the three elements illustrated in FIG. 8 is therefore that shown in FIG. 7 wherein it is seen that sleeve 47 within which is removably secured cavity member 48 is slidably received within the guiding member 31.

A tutoring track 63, preferably in the form of a channel, is provided laterally of and in the path of conveyor 1 as clearly illustrated in FIG. 2. Track 63 runs the full length of the conveyor except for a short distance along what is referred to above as the hopper means area and is open outwardly of the conveyor whereby it may constantly serve as a guiding track for the pins 55 of sleeves 47. The interconnection between sleeves 47 and guiding track 63 is illustrated in full lines in FIG. 2, two sleeves 47 being shown along the bottom strand while one is shown along the top strand of conveyor 1.

As mentioned previously, the guiding tutoring track 63 is cut open in the hopper means area and therein replaced by what is referred to as the oscillating means for the cavity members (together with sleeves 47) as the latter pass under the hopper means.

Figure 6:
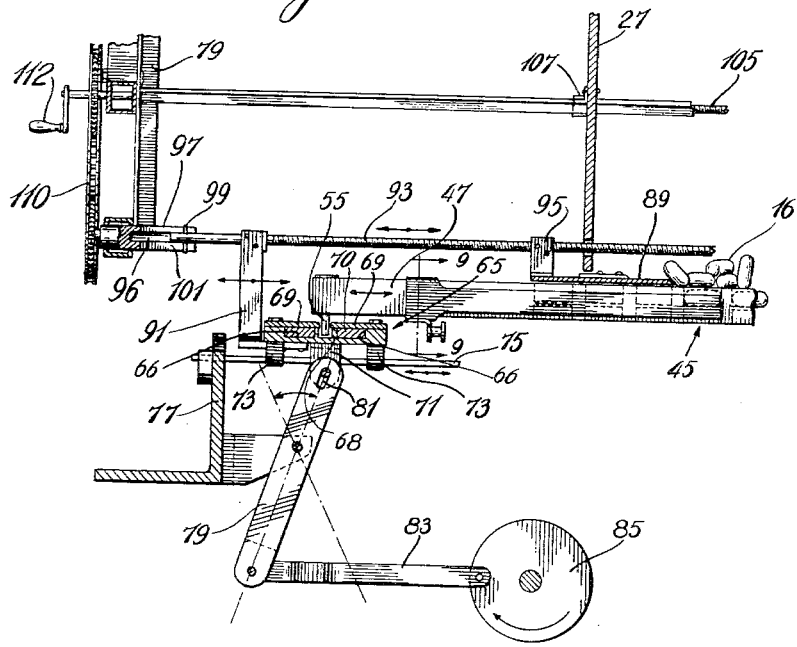
FIG. 6 is a transverse cross-sectional view of the side of the conveyor showing the oscillating means.

This oscillating means which is more particularly illustrated in FIGS. 4, 5 and 6 is generally composed of an oscillatable tutoring track made up of a central part 65 pivotally connected at the ends thereof to two linking parts 67, 67', which, in turn, are pivotally connected to the straight stationary section of 63 of the tutoring track.

The central part 65 is a substantially flat member formed with two longitudinal square grooves 66 separated by a central groove 68, as shown in FIG. 6. Square grooves 66 are closed by spaced elements 69 between which, and within central groove 68, ride pins 55. Two pairs of spaced flat bars 70, 70', which form part of the linking tutoring parts 67, 67', respectively, are slidable in square grooves 68 and connected at their outer ends to two other spaced bars 72, 72' (FIG. 5).

Also, the central part 65 has a pair of spaced central lugs 71 as well as guiding ears 73 near the ends thereof, ears 73 being slidably mounted on guiding rods 75 secured to the frame 77 of the machine. To frame 77 is also connected a lever 79, at about midlength thereof. One end of lever 79 is pivotally connected to lug 71 through an elongated slot 81 and the other end is pivotally secured to the connecting rod 83 which has its other end fixed to the periphery of a driving wheel 85.

It will thus be understood that rotation of driving wheel 85 will cause central part 65 to reciprocate transversely of conveyor 1 and, consequently, to force sleeve 47 and cavity member 48 into a similar movement, the latter cooperating with elements 69 through pin 55.

During transverse movement of central part 65, flat bars 70, 70' are slidably displaced in grooves 66.

In order to prevent a tablet which would happen to be partially in and partially out of a cavity to be crushed between the said cavity and the arrester plate 27 (see FIG. 6) a horizontal plate 89 is provided which, in conjunction with arrester plate 27, is synchronized to travel with the oscillating bars 45. Turning to FIG. 3, it will been seen that whenever bars 45 oscillate transversely of the conveyor, horizontal plate 89 will follow suit thus preventing any pills from being crushed between a cavity wall and arrester plate 27 had plate 89 been omitted. Means must therefore be provided to synchronize movement of plate 89 with that of bars 45. This synchronizing means is best illustrated in FIG. 6 which shows it as being made up of a pair of brackets 91 having one end secured to central part 65 while the other ends are threadedly mounted on operating screws 93 which also thread into blocks 95 secured to horizontal plate 89 lying over bars 45 as previously explained.

One end of screw 93 is received in a bore 96 of a bearing 97 for sliding displacement therein, radial pins 99 on the screw end 93 travelling in a slit 101 (see FIG. 2) thus preventing unwarranted rotation of screw 93.

As will be understood from the above description and from FIG. 6, whenever bars 45 oscillate transversely across conveyor 1, because of the aforesaid arrangement, plate 89 will follow the same movement, the end of screw 93 reciprocating in bore 95. It may be necessary to adjust plate 89 to cover one or more cavities of the bars in order to reduce the cavity multiple or the number of useful cavities in a row. For this purpose, screw 93 must be threaded in the proper direction to cause relative displacement between plate 89 and bars 45 but it is also necessary that arrester plate 27 be kept in the same relative position with regard to plate 89. For this purpose, further screws 105 are provided which thread through blocks 107 secured to the arrester plate 27 (see FIG. 6). Screws 105 are in turn mounted on suitable gears 109 which, along with gears 111 of screws 93 are brought into rotation by a common chain 110 driven by the handle 112 secured at the end of one of the screws. By rotation of handle 112, both screws 93 and 105 will displace plates 89 and 27 simultaneously. It will thus be possible to mask some of the cavities in blocks 45 to, as said before, reduce the number of useful cavities.

It was also mentioned previously that the row of cavities 19 on member 48 stopped short of one end thereof as illustrated in FIG. 8. As a stationary arrester plate has to be provided across from arrester plate 27 on the other side of conveyor 1, in order to prevent one or more tablets from being squeezed between the wall of a cavity and said arrester plate, it is proposed to leave the particular end of each member 48 free from cavities so that during oscillation, no cavity will move under this vertical arrester plate. Thus, any crushing of tablets is avoided on that side while the arrester plate will provide the necessary function of preventing spillage of tablets off the conveyor.

I claim:

1. In a machine for dividing bulks of small identical objects such as tablets into numerically equal lots, the combination comprising: a travelling conveyor formed with a succession of interconnected parallel open top guiding members; a bar, having at least one row of aligned cavities, for the reception of tablets, slidably mounted in each guiding member with the cavities opening through said open top and for movement axially of the guiding member and transversely of said conveyor; hopper means over said conveyor to discharge tablets thereon and oscillating means connecting to the bars, as they pass under said hopper means, to cause transverse reciprocation thereof to shake said tablets into the cavities.

2. In a machine for dividing bulks of small identical objects such as tablets into numerically equal lots, the combination comprising: a travelling conveyor formed with a succession of transverse bars each having at least one row of cavities each adapted to receive a tablet; hopper means over said conveyor to discharge tablets thereon; each bar having one end projecting out of its guiding member and provided with a downwardly projecting tutoring pin; a tutoring track alongside said conveyor into which said pins are received and oscillating means to transversely reciprocate said track in the area of said hopper means to oscillate the bars through said pins as they pass under said hopper means area to shake said tablets in the cavities of the bars.

3. A combination as claimed in claim 2 wherein each bar is formed of an open top sleeve and of a cavity member removably secured therein with the cavities thereof opening through said open top of said sleeve, whereby cavity members of varying cavity shape and size may be used.

4. A combination as claimed in claim 2 wherein said tutoring track is formed of a straight rigid section, outside said hopper means area, and a movable section in said area having a central part slidably connected at the ends to one end of two linking parts, the other ends of the linking parts being, in turn, pivotally connected to said straight section; said oscillating means acting on said central part.

5. A combination as claimed in claim 4, including a horizontal plate lying over said conveyor, in the hopper means area; means to transversely adjust the position of said plate to mask a desired number of cavities and direct movement transmitting connecting means joining said plate to said central part of said removable section to impart to the plate the reciprocating motion of the movable section.

6. In a machine for dividing bulks of small identical objects such as tablets into numerically equal lots, the combination comprising: a travelling conveyor formed with a succession of interconnected parallel open top elongated guiding members; an elongated bar, having one row of aligned cavities for the reception of tablets, slidably mounted in each guiding member with the cavities opening through said open top and for movement lengthwise of the guiding member; hopper means over said conveyor to discharge tablets thereon; each bar having one end projecting out of its guiding member and provided with a downwardly projecting tutoring pin; a tutoring track alongside said conveyor into which said pins are received and oscillating means to transversely reciprocate said track in the area of said hopper means to oscillate the bars through said pins as they pass under said hopper means area to shake said tablets in the cavities of the bars.

7. A combination as claimed in claim 6, wherein said tutoring track is formed of a straight rigid section, outside said hopper means area, and a movable section in said area having a central part slidably connected at the ends to one end of two linking parts, the other ends of the linking parts being, in turn pivotally connected to said straight section; said oscillating means, acting on said central part, including a horizontal plate lying over said conveyor, in the hopper means area; means to transversely adjust said plate to mask a desired number of cavities and direct movement transmitting connecting means joining said plate to said central part of said removable section, to impart to the plate, the reciprocating motion of the movable section, a vertical arrester plate extending longitudinally of said conveyor and over said horizontal plate to prevent tablets from falling off said conveyor; said means to transversely adjust said horizontal plate being also connected to said vertical arrester plate so that both plates may move together.

References Cited by the Examiner

UNITED STATES PATENTS 1,460,778   7/1923   Wilkie _____ 221—253 X

HUGO O. SCHULZ, *Primary Examiner.*

EDWARD A. SROKA, *Examiner.*